US008868582B2

(12) United States Patent
Fitzer et al.

(10) Patent No.: US 8,868,582 B2
(45) Date of Patent: Oct. 21, 2014

(54) REPOSITORY INFRASTRUCTURE FOR ON DEMAND PLATFORMS

(75) Inventors: Joachim Fitzer, Schriesheim (DE); Juergen Specht, Benningen (DE); Ye Jin, Nuremberg (DE); Juergen Sattler, Wiesloch (DE)

(73) Assignee: SAP AG, Walldorf (DE)

( * ) Notice: Subject to any disclaimer, the term of this patent is extended or adjusted under 35 U.S.C. 154(b) by 451 days.

(21) Appl. No.: 12/861,304

(22) Filed: Aug. 23, 2010

(65) Prior Publication Data

US 2012/0047139 A1   Feb. 23, 2012

(51) Int. Cl.
*G06F 17/30* (2006.01)
(52) U.S. Cl.
CPC .................................. *G06F 17/3056* (2013.01)
USPC ......................................................... 707/758
(58) Field of Classification Search
USPC ................................................. 707/736, 758
See application file for complete search history.

(56) References Cited

U.S. PATENT DOCUMENTS

| | | | |
|---|---|---|---|
| 2006/0235831 A1* | 10/2006 | Adinolfi et al. | 707/3 |
| 2007/0156700 A1* | 7/2007 | Becker | 707/10 |
| 2007/0156714 A1* | 7/2007 | Becker | 707/100 |
| 2008/0162544 A1* | 7/2008 | Weissman et al. | 707/103 R |
| 2010/0005055 A1* | 1/2010 | An et al. | 707/2 |
| 2010/0235837 A1* | 9/2010 | Weissman et al. | 718/1 |
| 2011/0219046 A1* | 9/2011 | Nesmyanovich et al. | 707/812 |

* cited by examiner

*Primary Examiner* — Joshua Bullock
(74) *Attorney, Agent, or Firm* — Mintz Levin Cohn Ferris Glovsky and Popeo, P.C.

(57) ABSTRACT

In an aspect there is provided a method. The method may include providing, at a repository, storage for a plurality of tenants, providing a plurality of layers, and providing a plurality of versions; and separating, based on the plurality of layers and the plurality of versions, data for each of the plurality of tenants, wherein during runtime one of the plurality of tenants corresponds to the plurality of layers and one of the plurality of versions. Related apparatus, systems, techniques and articles are also described.

10 Claims, 11 Drawing Sheets

REPOSITORY INFRASTRUCTURE FOR ON DEMAND PLATFORMS

TECHNICAL FIELD

The subject matter described herein relates to a repository.

BACKGROUND

Various organizations make use of enterprise resource planning (ERP) software architectures to provide an integrated, computer-based system for management of internal and external resources, such as for example tangible assets, financial resources, materials, customer relationships, and human resources. In general, an ERP software architecture is designed to facilitate the flow of information between business functions inside the boundaries of the organization and manage the connections to outside service providers, stakeholders, and the like. Such architectures often include one or more centralized databases accessible by a core software platform that consolidates business operations, including but not limited to those provided by third party vendors, into a uniform and organization-wide system environment. The core software platform can reside on a centralized server or alternatively be distributed across modular hardware and software units that provide "services" and communicate on a local area network or over a network, such as for example the Internet, a wide area network, a local area network, or the like.

As part of the installation process of the core software platform on computing hardware owned or operated by the organization, one or more customized features, configurations, business processes, or the like may be added to the default, preprogrammed features such that the core software platform is configured for maximum compatibility with the organization's business processes, data, and the like.

The core software platform of an ERP software architecture can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible. Smaller organizations can also benefit from use of ERP functionality. However, such an organization may lack the necessary hardware resources, IT support, and/or consulting budget necessary to make use of a standalone ERP software architecture product and can in some cases be more effectively served by a software as a service (SaaS) arrangement in which the ERP system architecture is hosted on computing hardware such as servers and data repositories that are maintained remotely from the organization's location and accessed by authorized users at the organization via a thin client, such as for example a web browser, over a network.

In a software delivery configuration in which services provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it is typically advantageous to host multiple tenants on a single system that includes multiple servers and that maintains data for all of the multiple tenants in a secure manner while also providing customized solutions that are tailored to each tenant's business processes.

SUMMARY

In one aspect, there is provided a method. The method includes providing, at a repository, storage for a plurality of tenants, providing a plurality of layers, and providing a plurality of versions; and separating, based on the plurality of layers and the plurality of versions, data for each of the plurality of tenants, wherein during runtime one of the plurality of tenants corresponds to the plurality of layers and one of the plurality of versions.

In another aspect, there is also provided a method including receiving, at an application programming interface of a repository, a request for a data object, wherein the data object is managed by the repository and stored at a service provider; retrieving the data object based on metadata defining at least one of a name, a version, a solution, and a branch to identify the data object within a multi-tenant computing system; and providing the retrieved data object In one or more variations of the above aspects, the following may be provided. The retrieving may further include retrieving the data object from a file system defined for each tenant of the multi-tenant computing system. The application programming interface may include a maintenance application programming interface, a designtime application programming interface, and a runtime application programming interface, each of which interfaces a corresponding user interface and a repository engine including a core toolbox. The plurality of layers and the plurality of versions may be transparent to the tenants. The visibility to the tenants of the plurality of layers and the plurality of versions is configurable for the tenant. The plurality of versions include a version field including a timestamp and at least one branch. The first layer of the plurality of layers may correspond to a first solution for a first tenant of the plurality of tenants, and a second layer of the plurality of layers may correspond to a second solution for a second tenant of the plurality of tenants. The first solution may be represented by a first primary key indicating data and at least one application for the first tenant. The second solution may be represented by a second primary key indicating data and at least one application for the second tenant.

Articles of manufacture are also described that comprise machine executable instructions permanently stored on machine readable media (e.g., non-transitory computer readable media), which, when executed by a machine, causes the machine to perform the operations described herein. Similarly, computer systems are also described that may include a processor and a memory coupled to the processor. The memory may temporarily or permanently store one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
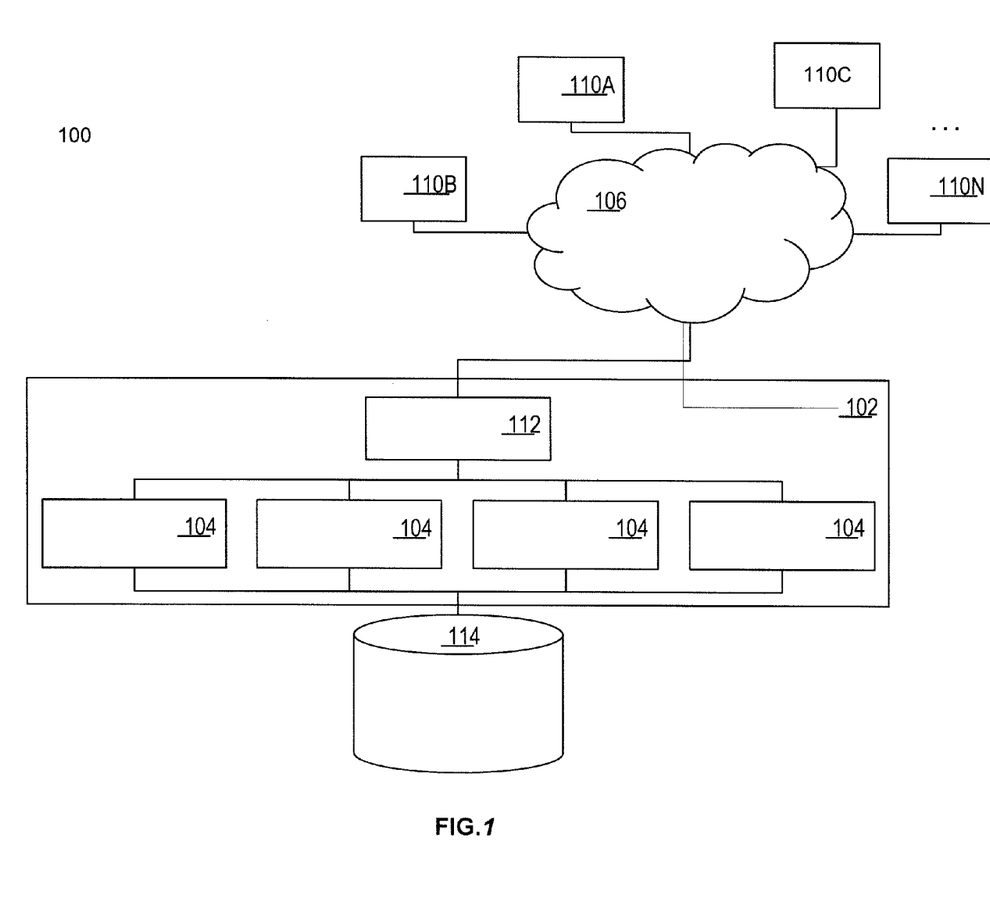
FIG. 1 is a diagram of a multi-tenant computing system.

FIG. 1 shows a block diagram of a multi-tenant implementation of a software delivery framework 100 that includes an application server 102, which can in some implementations include multiple server systems 104 that are accessible over a network 106 from client machines operated by users at each of multiple organizations 110A-110C (referred to herein as "tenants" of a multi-tenant computing system) supported by a single software delivery framework 100. One example of such a software delivery architecture can include features similar to those of the Business ByDesign™ software available from SAP AG (Walldorf, Germany).

For a system in which the application server 102 includes multiple server systems 104, the application server can include a load balancer 112 to distribute requests and actions from users at the one or more organizations 110A-110N to the one or more server systems 104. A user at 110A-N can access the software delivery architecture across the network using a thin client, such as for example a web browser or the like, or other software running on a physical machine. The application server 102 can access data and data objects stored in one or more data repositories 114.

Figure 2:
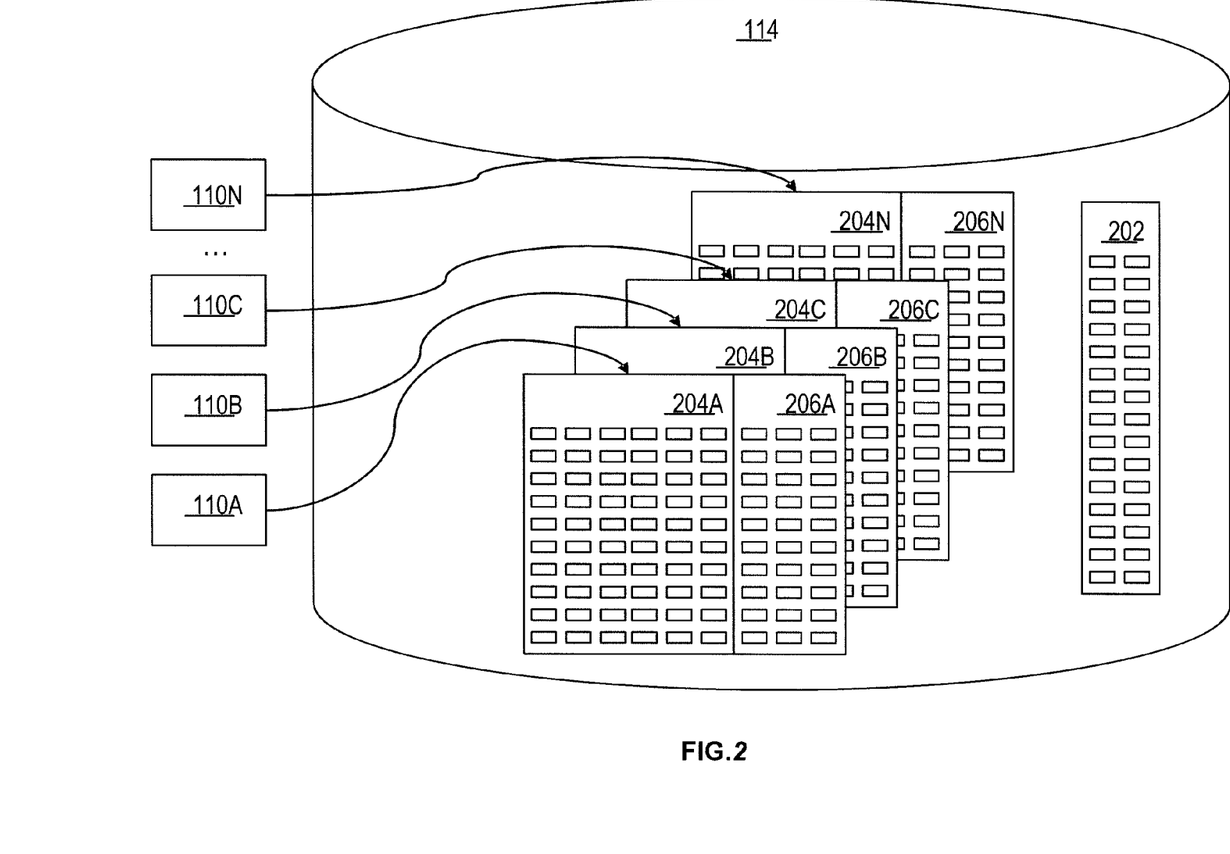
FIG. 2 is a diagram illustrating various types of content stored in the multi-tenant computing system of FIG. 1.

To provide for customization of the core software platform for each of multiple organizations supported by a single software delivery framework 100, the data and data objects stored in the repository or repositories 114 that are accessed by the application server 102 can include three types of content as shown in FIG. 2: core software platform content 202, system content 204, and tenant content 206.

Core software platform content 202 includes content that represents core functionality and is not modifiable by a tenant.

System content 204 can in some examples be created by the runtime of the core software platform and can include core data objects that are modifiable with data provided by each tenant. For example, if the core software platform is an enterprise resource planning (ERP) system that includes inventory tracking functionality, the system content 204A-204N can include data objects for labeling and quantifying inventory. The data retained in these data objects are tenant-specific, for example, each tenant 110A-110N stores information about its own inventory.

Tenant content 206A-206N includes data objects or extensions to other data objects that are customized for one specific tenant 110A-110N to reflect business processes and data that are specific to that specific tenant and are accessible only to authorized users at the corresponding tenant. Such data objects can include a key field to identify a specific organization or tenant within the multi-tenant environment of FIG. 1 as well as one or more of master data, business configuration information, transaction data or the like. For example, tenant content 206 can include user interface components customized for a specific organization or tenant within the multi-tenant environment of FIG. 1 as well as condition records in generated condition tables, access sequences, price calculation results, or any other tenant-specific values. A combination of the software platform content 202 and system content 204 and tenant content 206 of a specific tenant are presented to users from that tenant such that each tenant is provided access to a customized solution having data that is available only to users from that tenant.

Figure 3:
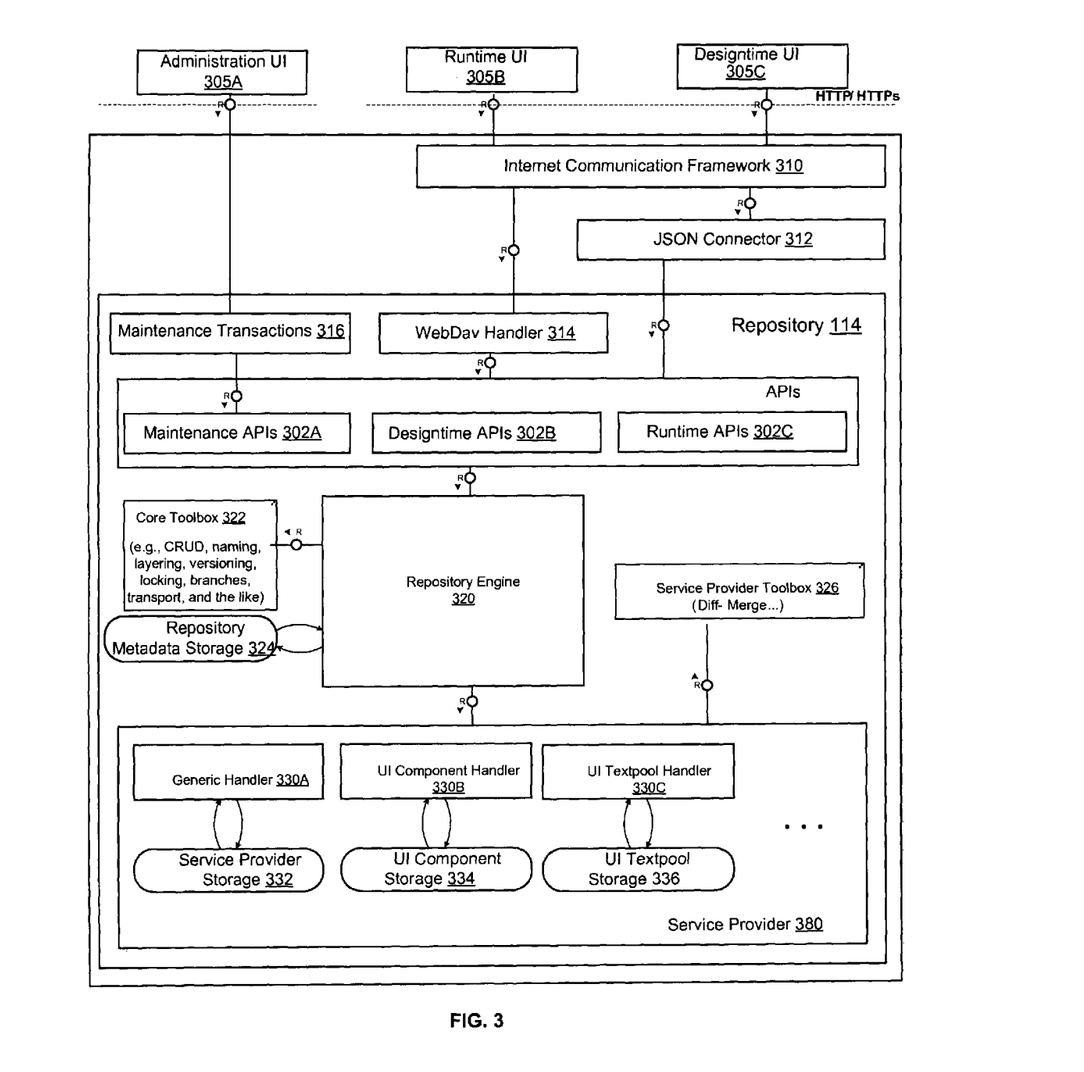
FIG. 3 is a diagram illustrating a repository which may be used in a multi-tenant computing system.

FIG. 3 depicts an example implementation of the data repository 114. The data repository 114 may include data (also referred to herein as data content, content, and/or data objects) for the software delivery framework 100. For example, the data repository 114 may include data for each of the tenants (e.g., at organizations 110A-N) within the multi-tenant environment of FIG. 1. Such data may include tenant content 206, although the data may also include core software platform content 202 and system content 204 as well.

The data repository 114 may include a plurality of application programming interfaces (APIs) 302A-C, each of which may be accessed by corresponding user interfaces, such as a maintenance user interface 305A, a runtime user interface 305B, and a designtime user interface 305C. The user interfaces 305A-c may be implemented as a thin client, although other types of clients may be used as well.

The administrative user interface 305A enables a user (e.g. a developer, a system administrator, and the like) to establish, manage, and/or maintain the data repository 114. For example, the administrative user interface 305A may be used to register a service provider, create solutions, create projects, handle transport of data objects, and other administrative/maintenance matters.

The designtime user interface 305C enables a user to operate in a designtime mode (e.g., to design user element components, and the like). On the other hand, the runtime user interface 305B enables a user to operate in a runtime mode (e.g., to run the user element components at user interface 305B).

The designtime user interface 305C and the runtime user interface 305B may communicate via an interne communication framework 310 using protocols, such as hypertext transfer protocol (HTTP), hypertext transfer protocol secure (HTTPS), and Simple Mail Transfer Protocol (SMTP). In some implementations, simple HTTP-calls (e.g., get, post, etc.) are routed directly to handler 314 or via a Java Script Object Notation (JSON) connector 312 to the data repository APIs 302A-C. The JSON connector 312 provides a JSON-complaint data-interchange format.

The handler 314 provides an interface used to upload unstructured data to the designtime user interface 305C and the runtime user interface 305B. The handler 314 may provide a web interface supporting, for example, HTTP browsing. The handler 314 may also be used to upload and download content into the data repository 114.

The handler 314 may also support Web Distributed Authoring and Versioning (WebDav). When this is the case, the handler 314 includes a WebDav Server configured with WebDav functions, such as options, get, profind, put, delete, copy, move, and the like.

The maintenance transaction 316 handles maintenance transactions, such as ABAP-based transactions, to administrate the repository 114, such as for example the creation of a new solution or the definition of a new layer strategy.

The data repository 114 may include a repository engine 320 for providing a central processing unit including a memory, the core toolbox module 322, metadata storage 324, a service provider toolbox 326, and a service provider 326.

In some implementations, the repository engine 320 and the core toolbox module 322 are configured to provide one or more of the following functions: create, read, update, delete, query, addressing, naming, layering, versioning, locking, transport handling, caching, branches, a registry, and the like. Moreover, the repository engine 320 is responsible for storing, retrieving, and searching for content, such as resource-based content including XML files. The repository engine 320 may also provide multi-version support, layering, and revision control (e.g., check-in, check-out, file-locking, activation, where-used, and version-merge).

The APIs 302A-C enable access to core functionalities at the core toolbox module 322. These core functionalities enable operations to be performed on data content which is managed by the data repository 114.

The data content managed by the data repository 114 is separated into metadata content, such as solutions, branches, file paths, versions, administrative data, and the like, and the data content itself (e.g., an XML file streamed as a so-called blob). Metadata content is typically stored by the data repository 114 core, while data content is stored by one or more service providers (e.g. a service provider 380). Content metadata may be managed by the data repository 114 core homogeneously for all content regardless of the type of content. However, depending on the type of content, dedicated service providers 380 may manage data content heterogeneously, and specific, individual actions (such as plausibility checks) may be performed by the service provider 380. Both content metadata and data may be accessed uniformly by a user interface via APIs 302A-C.

The service provider toolbox 326 provides operations such as a diff-merge (described further below) which is used by one or more service providers, such as service provider 380.

The service provider 380 may include one or more functions, such as a generic service provider storage 332, a user interface component storage service provider 334, and a user interface text pool storage 336, all of which may be used by the data repository 114 and serve as a set of templates for developing other service providers.

The handlers 330A-C may be implemented as a service provider and are responsible for the implementation of content type-specific semantics (e.g., plausibility checks and content type-specific additional storage).

The service provider 380 may provide the generic service provider storage 332 to store unstructured data objects, such as dynamic link libraries, images, simple blob storage, and the like. The generic service provider storage 332 may, in some implementations, store the data objects in a database in a database table, which uses a key provided by the data repository 114.

For structured information like user interface components, the service provider 380 may provide user interface component storage service provider 334. The user interface component storage service provider 334 includes metadata representative of the internal buildup of a user interface component (e.g., a model part, a controller part, and a view part). The model part contains a binding to business objects and represents the data sources available in the user interface. The controller part represents user interface logic and includes/references script coding. The view part contains the user elements and layout.

The service provider 380 may include user interface text pool storage 336 for storage of a segment, which lists all the language dependent text strings used in a user interface.

Figure 4:
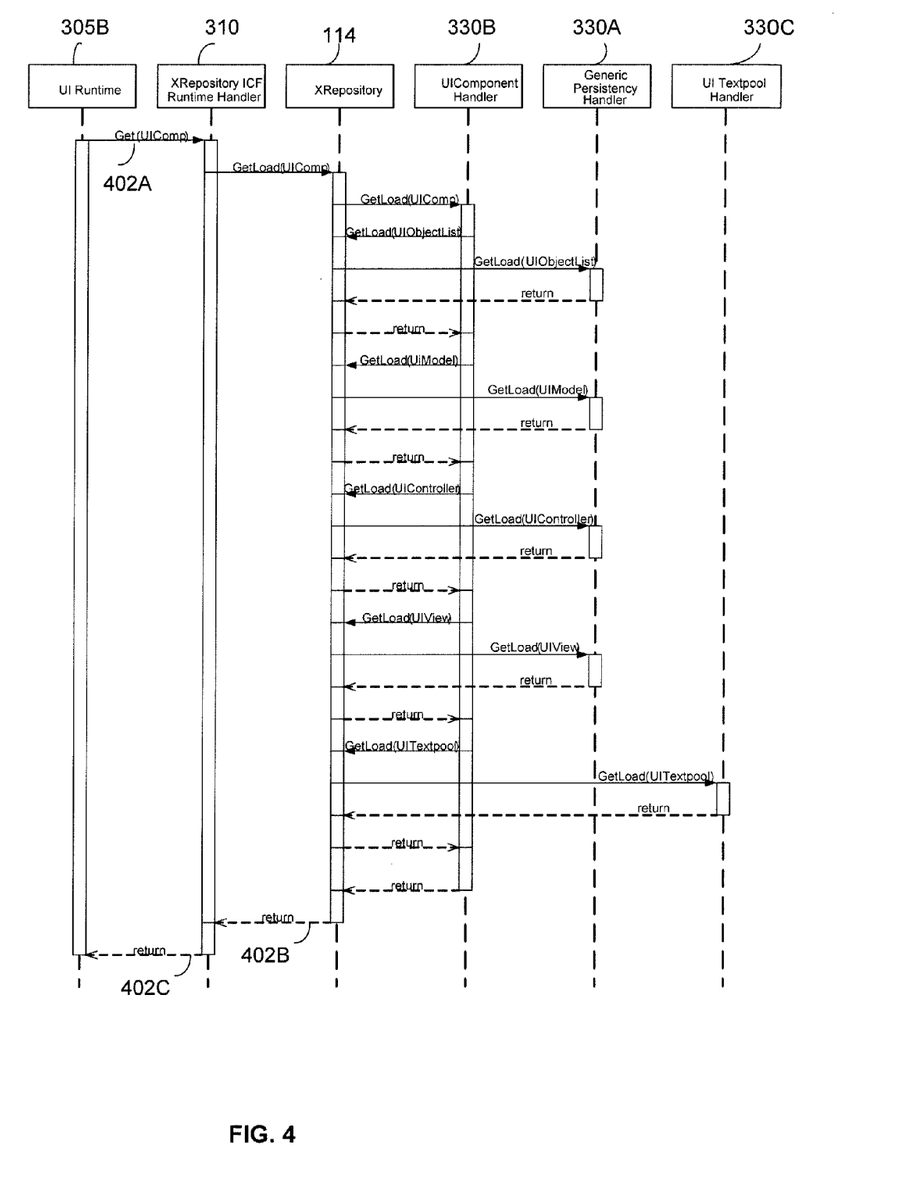
FIG. 4 is a process flow diagram illustrating runtime access via he repository.

FIG. 4 depicts a sequence diagram for the runtime user interface 305B accessing a user interface component. Generally, the data repository 114 delegates a call 402A for a user interface component to a special service provider (not shown) which is able to buildup the user interface component. In the example of FIG. 4, the special service provider asks the data repository 114 to retrieve the elements (e.g., the object list, the model, the controller, the view, and the text pool for the required UI component) to build the user interface component. The elements are retrieved from the generic service provider storage 332, the user interface component storage service provider 334, and the user interface text pool storage 336. This special service provider also assembles the retrieved parts, and returns the built up user interface component to the data repository 114. The data repository 114 then provides built up user interface component at 402B-C to the runtime user interface 305B. Although FIG. 4 depicts the runtime user interface 305B, other user interfaces may be used as well.

In some implementations, the core tool box 322 of the data repository 114 provides naming. Naming provides a structured format for naming data managed by the data repository 114.

Figure 5:
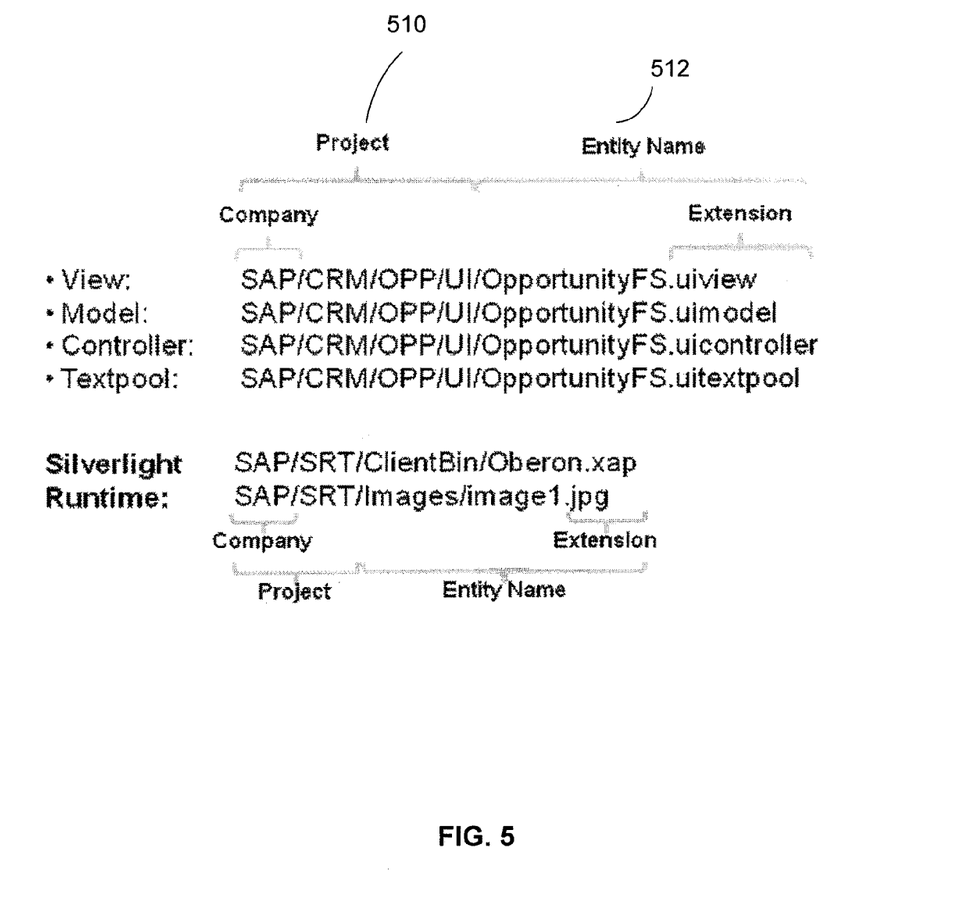
FIG. 5 depicts an example of a naming strategy for use with the repository.

FIG. 5 depicts an example of a naming structure including a project portion 510 and an entity name 512. Each entity name at FIG. 5 is assigned to a project. For example, "OpportunityFS.uiview" is assigned to project "SAP/CRM/OPP/UI." The naming may be controlled by a programmatic process at the core toolbox 322. The project portion 510 of the name of a data object may be used as a unique identifier within data repository 114 to enable management of data objects (e.g., allowing retrieval and/or other actions to data managed by the data repository 114).

In some implementations, the core tool box 322 of the data repository 114 provides versioning to enable management of data objects. For example, the data repository 114 may use a timestamp (e.g., universal time code, etc) as a version field. Whenever a new version is created of a data object managed by the data repository 114, the data repository 114 will add a timestamp to identify different versions of data or data objects.

Figure 6:
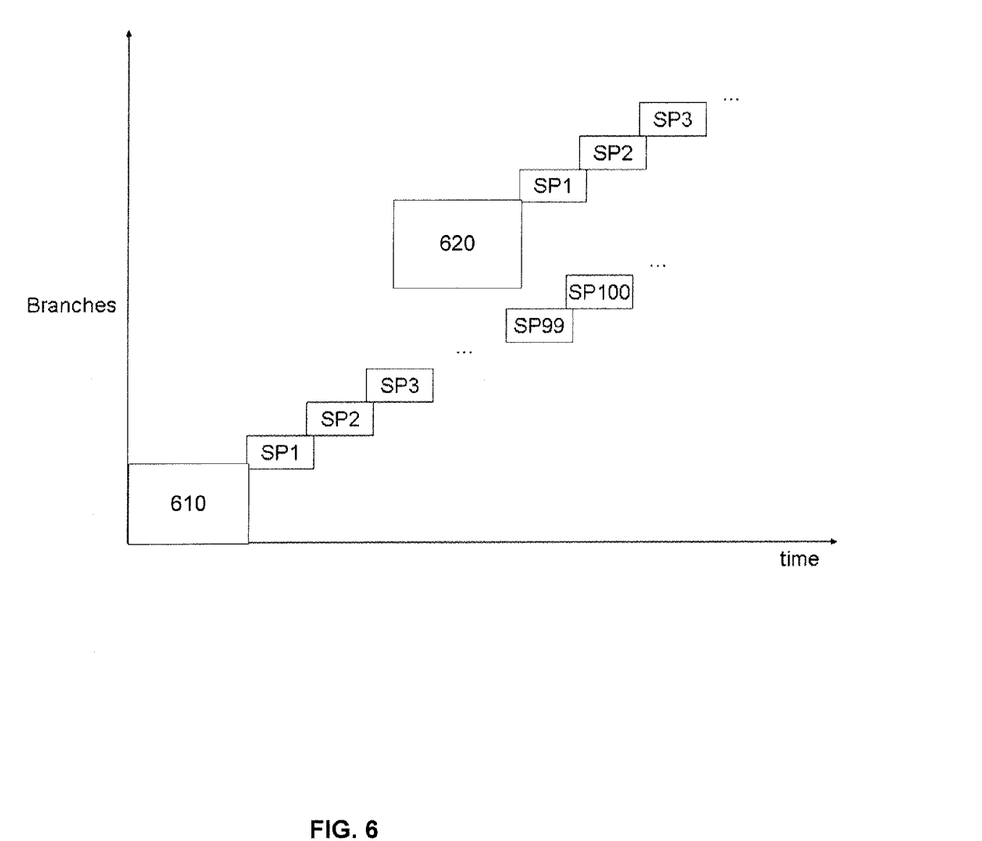
FIG. 6 depicts an example of solutions including branches for use with the repository.

FIG. 6 depicts an example of how versioning may be used. For example, a development may include parallel development for different versions, such as version 610 and version 620, each having a stream of support packages (SP). In the example of FIG. 6, there exists some overlap, showing that a timestamp alone may not be sufficient, as ambiguities would be created if timestamps alone were used to identify data objects. To address these ambiguities, branches may be used in addition to timestamps to enable management of data objects.

The core tool box 322 of the data repository 114 provides so-called "branches" to enable management of data objects. The branch may be defined (e.g., configured) at the outset of development or some other type of activity. For example, before being able to add content to data repository 114, a so-called "solution" may be defined. The solution may include defining an attribute which further defines a given branch. The branch may be fixed, so that the branch is not changed after the initial establishment of the branch. For example, a branch may be defined as a full branch or a delta branch. And, a software release may be defined as a full branch, while a support package may be defined as a delta branch.

Returning to the example at FIG. 6, the release for version 610 is considered a full branch, and the subsequent support packages, such as SP1 through SP100 are each defined as delta branches. When a delta branch is defined, it may refer to one or more predecessor branches, such as a full branch and/or a delta branch (e.g., a previous support package).

The subject matter described herein may thus provide a multi-layered and multi-versioned repository which stores tenant content in a clearly separated manner for each of a plurality of tenants. For example, for a given tenant, the given tenant appears as a single layered and single-versioned repository during runtime. The layering and versioning are thus transparent for the end using tenants. The visibility of layers and versions may also be configured for each tenant.

The core tool box 322 may also provide filtering based on versioning. For example, versioning may allow filtering data content via the data repository 114 to identify content that matches a given branch and/or predecessor branches referred to by the given branch.

When deleting content at data repository 114, a new version is created with the delete-flag set of the content header. The content data itself is not removed, but remains in the database. To undo the deletion, yet another, new version is created that has the delete-flag which is not set.

When deleting content that is assigned to a read-only layer at the data repository 114, a new version may be created in a writable layer that has a delete-flag set (which is often referred to as whiteout). In the style of COW (i.e., copy on write), this is referred to as WOD (i.e., whiteout on delete). To undo such a deletion, the whiteout is physically deleted, and the data repository 114 content of the layer below becomes visible again.

In some implementations, the core tool box 322 of the data repository 114 may support version control and locking in accordance with a so-called "pessimistic revision control" that allows a lock, modify, and unlock and/or a so-called "optimistic revision control" that follows a copy-modify-merge paradigm. In the case of the optimistic revision control, several users may modify the same data content at the same time. At activation time, the optimistic revision control attempts to merge the changes into a new version.

The core tool box 322 of data repository 114 may be implemented to separate the data content of different tenants. For example, each of the different tenants has some separate data content at the data repository to provide privacy, security, etc. The separation of data content may be provided by assigning solutions, as noted above, to tenants using or storing data content via the data repository 114. Specifically, the solution may be implemented as a primary key field of tables related to a given tenant using, or storing via, the data repository 114.

Figure 7:
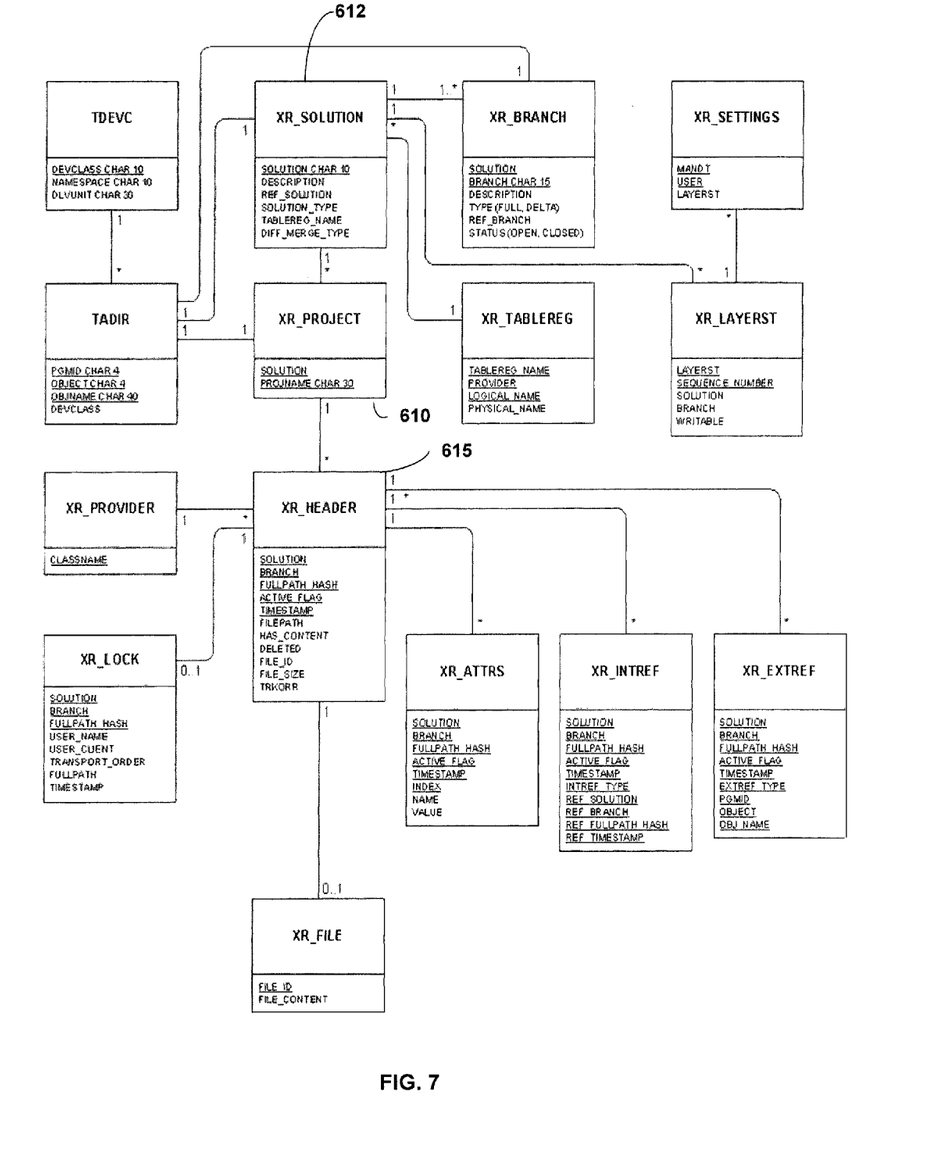
FIG. 7 depicts an example of a data model for use with the repository.

Referring to FIG. 7, the data repository 114 may include one or more tables as depicted at FIG. 7. The solution may be a primary key common to all of the tables associated with a given tenant in a multi-tenant system. For example, a given project 710 may include a solution (including a primary key) associating table 710 with other tables, such as tables 712 and the like. Thus, data for a given tenant may be layered using the solution (e.g., the primary key of the tables) to identify which entity (or entities) is entitled to access (e.g., view, read, write, and/or modify, etc.) data associated with the tables.

Moreover, access to the data repository 114 may be further enhanced by layering solutions. In addition, the order of solutions may provide a mechanism for controlling access to each of the layers. For example, a bottom layer may relate to a first tenant, another layer on the first layer may relate to a second tenant, and so forth. Moreover, the top-most layer in this example may be a user-specific layer for personalization to a given end user. Each of the layers may be configured as read-only or writeable.

Figure 8:
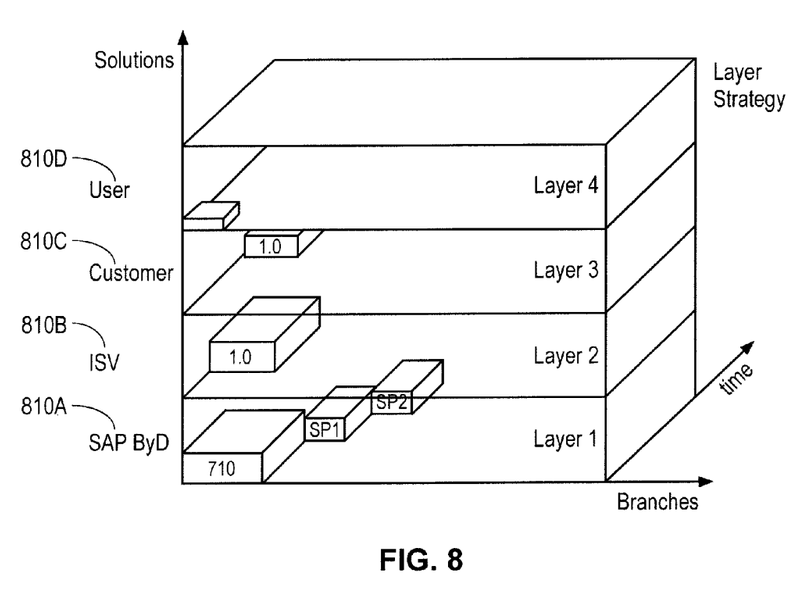
FIG. 8 depicts an example of layers for use with the repository.

FIG. 8 depicts separate layers 810A-D, each being assigned a solution (e.g., a user solution 810D, a customer solution 810C, and a third party client solution 810B, and a SAP by Design solution 810A). Moreover, each of the layers 810A-D is configured separately and accessed separately to ensure separation of data among the layers 810A-D. FIG. 8 also depicts that each layer may include one or more defined branches (e.g., full branches 810 and 1.0 and delta branches SP1 and SP2).

The data repository 114 may add one or more user-specific layers, such as layer 810D automatically to the configured layer strategy. In some implementations, the top-most layer may be, for example, marked as writable, while the layers below marked as read-only. In a COW configuration, the data content may be copied to a writable layer, while keeping a reference to the original content. On the other hand, in a WOD configuration, the content is marked as deleted in the writable layer.

With layering, the subject matter described herein enables separation of content from different sources, modification-free changes at the tenants, and tenant specific configurations which determine the visibility of the contents to other entities.

When searching content via the data repository 114, the defined and/or configured layers may be searched hierarchically (e.g., from top to bottom), and the content that is found first is returned.

For example, newly imported data content in the data repository 114 may be filtered by a layer filter at the core tool box 322. The filtering may filter serially through the layers until a layer is found which includes the new version for the newly imported data content. Thus, layer-based filter enables a user-specific layer-strategy that allows identification of the newly imported content, while limiting other users from viewing the new imported content. The corresponding layer filter configuration may, however, be changed to allow others to view the newly imported data content.

Figure 9:
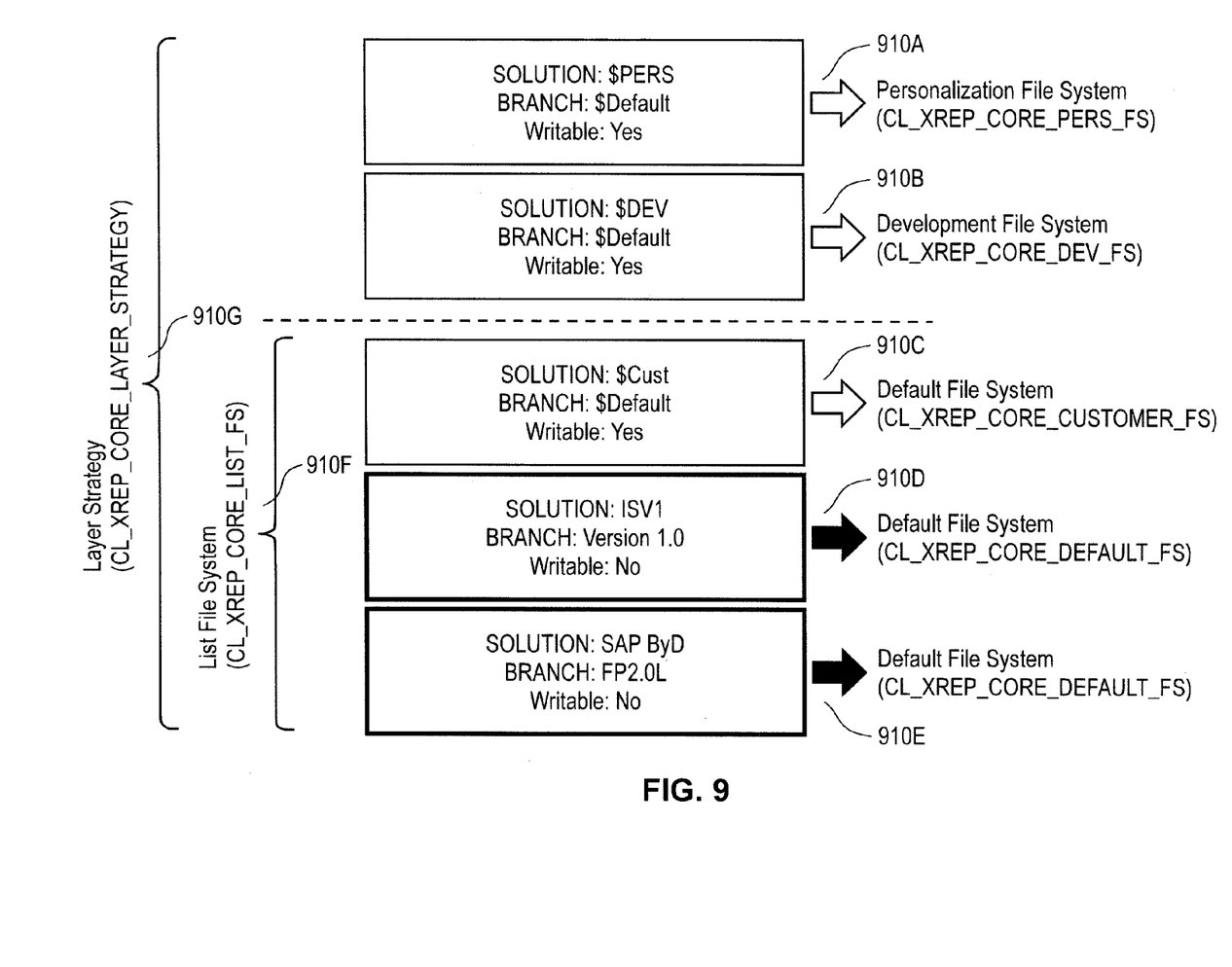
FIG. 9 depicts an example of a layered, file system for use with the repository.

The core tool box 322 of data repository 114 may also be configured to provide the file systems described herein. FIG. 9 depicts a page at a user interface depicting a file system at the data repository 114. Referring to FIG. 9, each layer may have a separate file system. For example, the personalization layer 910A may include a file system, the development layer 910B may include another file system, and each of the default file systems may include another file system.

The default file system at 910C-E may access a core header which is depicted in Table 1, and may define the operations provided by the default file systems. FIG. 6 depicts an example of a core header at 620.

TABLE 1

| >>interface<< IF_XREP_CORE_FILESYSTEM Operations |
|---|
| GET_DT_FILE |
| GET_RT_FILE |
| GET_HEADER_INFO |
| GET_FILE_VERSION |
| PUT_FILE_HEADER |
| PUT_FILE_CONTENT |
| ACTIVATE |
| WIPE_OUT |
| SET_DELETED |
| DELETE_FILE |
| IS_WRITABLE |

TABLE 1-continued

```
        >>interface<<
    IF_XREP_CORE_FILESYSTEM
          Operations

EXISTS_FILE
        LIST_FILES
        LOCK
        UNLOCK
        CHECK_LOCK
        GET_TRANSPORT_REQUESTS
        GET_VERSION_HISTORY
        TRANSFER_FROM
        LIST_PROJECT
```

The default file systems 910C-E are independent of any given user and/or client. The default file systems may provide, in the example of Table 1, a transport connection, a lock mechanism, get files, get header information, get file version, get file header, get file content, activate a change, wipe out data, set a flag as deleted content, delete a file, mark a file as writable, set a file as it exists, provide a list of files, lock a file, unlock a file, check a lock on a file, get version history, transfer a file, and list a project name.

The customer file system 910C is a default file system similar to the default file systems 910D-E in some respects. However, the customer file system 910C accesses a dependent header table which is specific to a client or a customer. In the customer file system 910C, any changes associated with a customer are stored. The customer file system does not provide the transport mechanism, but a lock mechanism is available so that no one from a given client is able to edit the same file concurrently.

The personalization file system 910A is user and client dependent. The personalization file system 910A stores user specific changes. For example, a user may personalize a user interface to change the order of the input fields on the user interface, hide some fields or a field group, change the label of the screen element, and/or add a mashup into the user interface screen. The personalization file system 910A may not be configured to provide transport and locking mechanisms. The personalization file system 910A may not be configured to store data content temporarily but rather store data content until explicitly removed.

The list file system 910F includes one or more layers defined in a layer strategy table (which in the example of FIG. 9 includes layers 910C-E). The list file system 810f creates corresponding default or customer file systems based on the defined layer sequences. Operation calls may be delegated to the corresponding file system depending on the defined sequences and whether a layer is writable.

The layer strategy file system 910G also implements a file system internally. The layer strategy file system 910G includes the list file system 910F and any other defined layers, such as layers 910A-B. The layer strategy file system 910G may delegate operations to the personalization, development, and/or list file systems.

In some implementations, the layer strategy file system 910G may include two modes. A first mode includes personalization as a top layer followed by lower layers for the development file system and the list file system. The first mode including personalization may be used for a typical, customer runtime environment, in which the primary changes are related to personalization. The second mode may only include a development file system and then the list file system. The second mode may be used for a development designtime environment including a work list and actions, such as edit, create, save, and activation.

Figure 10:
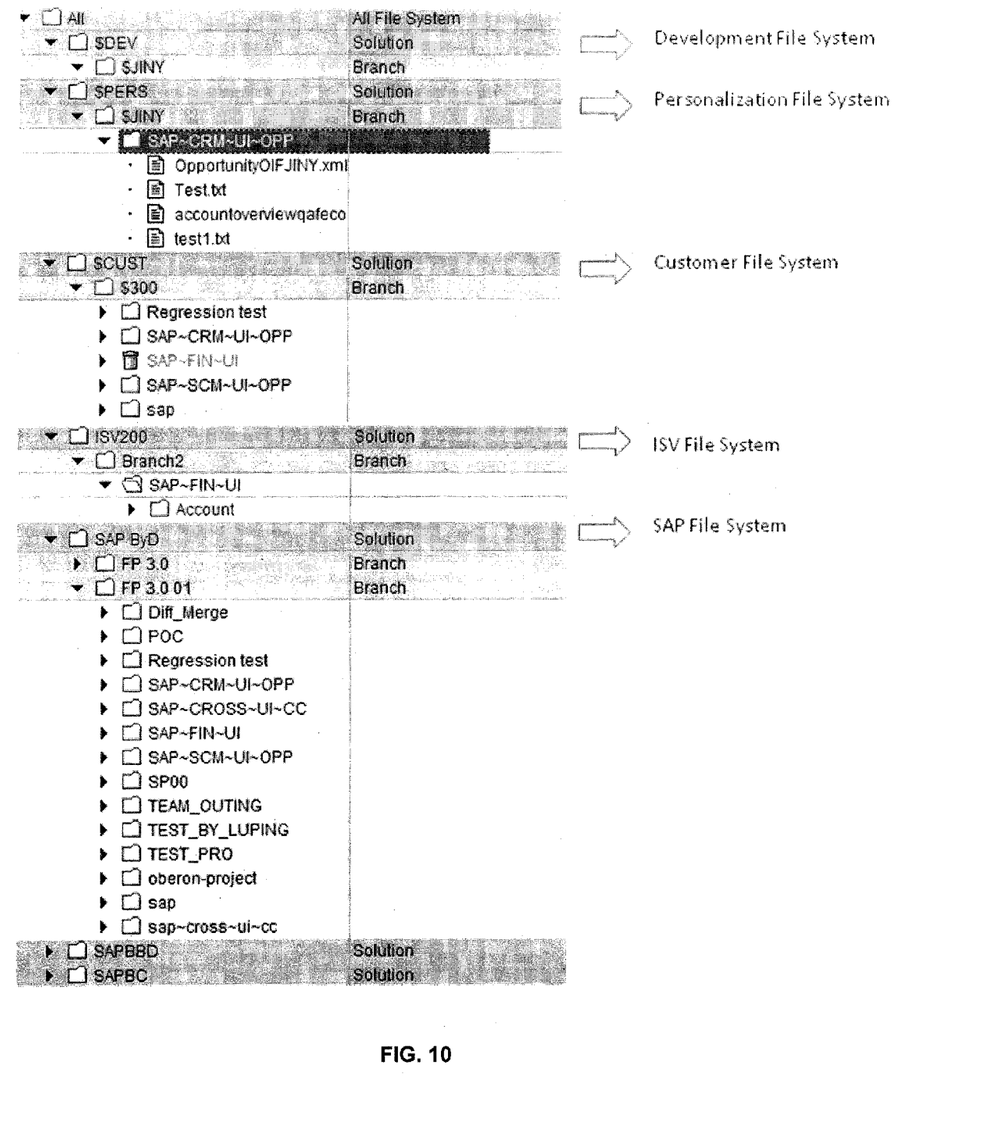
FIG. 10 depicts an example of a file system.

The data repository 114 may also include a separate file system configured for read-only access. FIG. 10 depicts an example view of the read-only file system. The all file system is a view of the repository 114 which shows all the contents regardless the tenant specific configuration of visibility. This may be used as part of the administration of the repository.

The layer strategy described herein may also dictate access to the personalization file system, development file system, and list file system.

Figure 11:
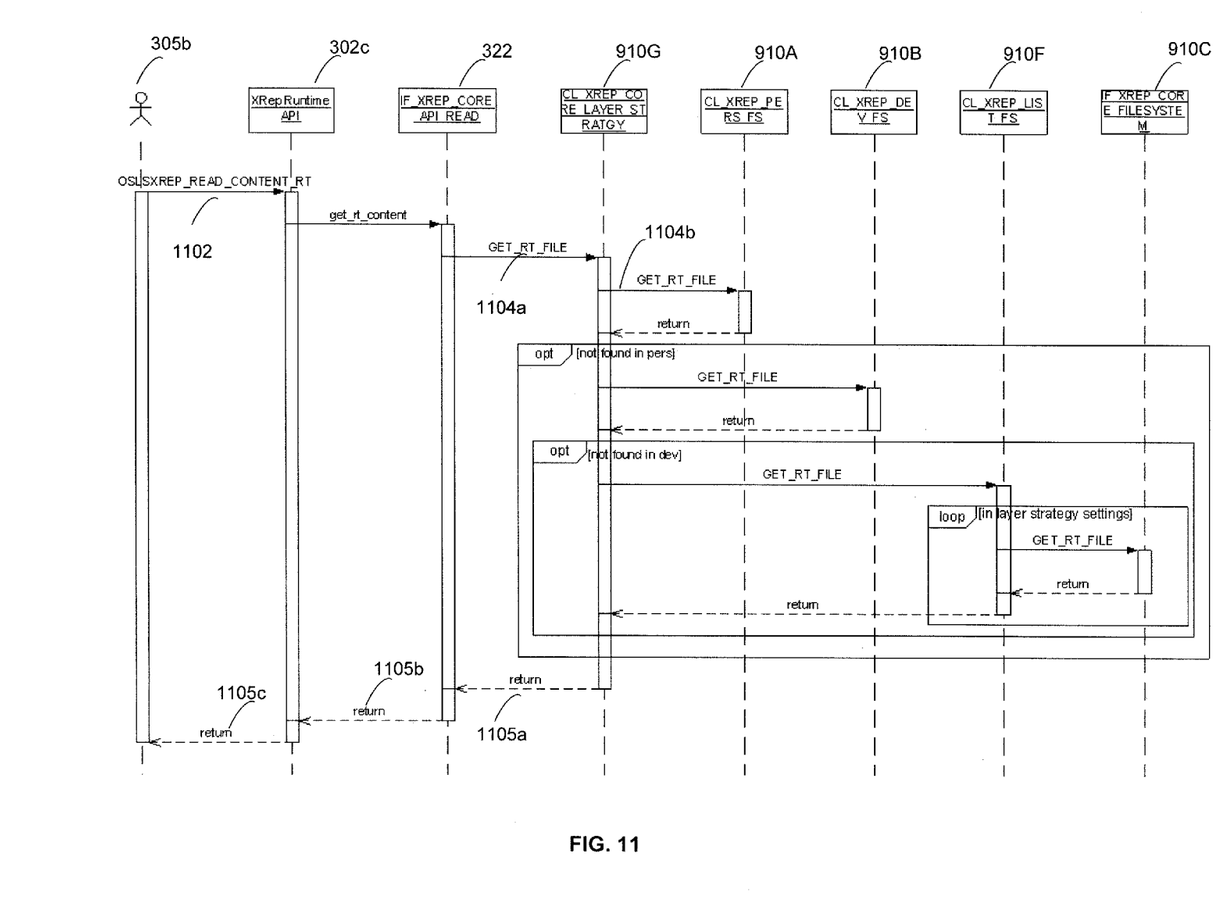
FIG. 11 depicts an example of read access to the layered, file system.

FIG. 11 depicts a call for a read access. During read access, the layers defined at the data repository 114 dictate delegation of a call to personalization, development, and list file systems in a layered manner. Referring to FIG. 11, a call 1102 is received at the core toolbox module 322. The call is delegated in a layered manner, sequentially. For example, the call is first delegated to the core layer strategy layer file system 910G, and then the call 1104b is delegated to the personalization layer file system 910A, and so forth through the layers if the sought after file is not found at a given layer. The file (e.g., including a data object) is then returned 1105a-c. Although FIG. 11 depicts the call sequence for read access, the call sequence would be similar in many respects for a write access and a write access for personalization to a given tenant.

In some implementations, after initial creation of a file, the file stays, at first, only in the development file system. After activation, the file is then placed into a corresponding file system, which is defined as writable in the layer strategy settings. If a user reverts the creation, the file may then be removed physically from the development file system.

With respect to edit access to the file systems, at first, a file is, in some implementations, copied from the original file system into a developer file system (e.g., using the copy-on-write (COW) paradigm). After activation, the changes may then be transferred into a writable file system.

With respect to deleting a file at a file system, deleting is, in some implementations, similar to editing in some respects. A special case of deletion is a whiteout that makes the file deletion invisible. If a file is already adapted in the writable file system configured as a COW, then it is possible to make the adaptation invisible using a deletion call. The data repository 114 may determine automatically whether a call is a normal deletion or a whiteout.

In some implementations, the service provider toolbox 326 may include a diff-merge mechanism. Diff-merge allows different versions of a file to be compared to determine a difference (which may be referred to as a delta). The difference between the two files is then merged into another file.

Although a variety of diff merge algorithms may be implemented, in some implementations, the diff merge algorithm at service provider toolbox 326 may be configured as a three-way merge for XML.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, while the descriptions of specific implementations of the current subject matter discuss delivery of enterprise resource planning software to multiple organizations via a multi-tenant computing system, the current subject matter is applicable to other types of software and data services access as well. In addition, the logic flow depicted in the accompanying figures and described herein do not require the particular order shown, or sequential order, to achieve desirable results. Other embodiments may be within the scope of the following claims.

What is claimed:

1. A non-transitory computer-readable storage medium including code which when executed by at least one processor provides operations comprising:
   receiving, at an application programming interface of a repository, a request for a data object, wherein the data object is managed by the repository and stored by a service provider;
   retrieving the data object based on metadata defining at least one of a name, a version, a solution, and a branch to identify the data object within a multi-tenant computing system serving a plurality of tenants; and
   providing the retrieved data object,
   wherein the data object comprises core software platform content, system content, and tenant content, wherein the core software platform content represents functionality that is not modifiable by the plurality of tenants, wherein the system content includes one or more core data objects that are modifiable by the tenant content, and wherein the tenant content includes data representative of a business process for at least one of the plurality of tenants.

2. The non-transitory computer-readable storage medium of claim 1, wherein the retrieving further comprises:
   retrieving the data object from a file system defined for each tenant of the multi-tenant computing system, wherein the file system definition for each tenant is based on a layer-visible configuration.

3. The non-transitory computer-readable storage medium of claim 1, wherein the application programming interface comprises a maintenance application programming interface, a designtime application programming interface, and a runtime application programming interface, each of which interfaces a corresponding user interface and a repository engine including a core toolbox.

4. The non-transitory computer-readable storage medium of claim 1, wherein the data object is a customized solution provided to the users of a specific tenant, wherein the data object comprises a combination of software platform content, system content and tenant content of a specific tenant, and wherein the operations further comprise making the customized solution available only to users of the specific tenant.

5. The non-transitory computer-readable storage medium of claim 1, wherein the repository is configured to provide storage for core software platform content, system content and for a plurality of tenant contents, wherein the operations further comprise the runtime of the core software platform content creating the system content.

6. The non-transitory computer-readable storage medium of claim 1, wherein the repository is configured to provide a plurality of layers, and provide a plurality of versions, wherein the operations further comprise separating the tenant content for each of the plurality of tenants based on the plurality of layers and the plurality of versions.

7. The non-transitory computer-readable storage medium of claim 6, wherein during runtime one of the plurality of tenants corresponds to the plurality of layers and one of the plurality of versions.

8. A method comprising:
   receiving, at an application programming interface of a repository, a request for a data object, wherein the data object is managed by the repository and stored by a service provider;
   retrieving the data object based on metadata defining at least one of a name, a version, a solution, and a branch to identify the data object within a multi-tenant computing system serving a plurality of tenants; and
   providing the retrieved data object, wherein at least one of the receiving, the retrieving, and the providing are implemented on at least one processor,
   wherein the data object comprises core software platform content, system content, and tenant content, wherein the core software platform content represents functionality that is not modifiable by the plurality of tenants, wherein the system content includes one or more core data objects that are modifiable by the tenant data object, and wherein the tenant content includes data representative of a business process for at least one of the plurality of tenants.

9. The method of claim 8, wherein the retrieving further comprises:
   retrieving the data object from a file system defined for each tenant of the multi-tenant computing system.

10. The method of claim 8, wherein the application programming interface comprises a maintenance application programming interface, a design time application programming interface, and a runtime application programming interface, each of which interfaces a corresponding user interface and a repository engine including a core toolbox.

* * * * *